(12) United States Patent
Tabone et al.

(10) Patent No.: US 9,128,664 B1
(45) Date of Patent: Sep. 8, 2015

(54) INVERTIBLE CLAMSHELL NOTEBOOK COMPUTER

(75) Inventors: Ryan Tabone, San Francisco, CA (US); Andrew Bowers, San Francisco, CA (US); Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 362 days.

(21) Appl. No.: 13/605,211

(22) Filed: Sep. 6, 2012

Related U.S. Application Data

(60) Provisional application No. 61/587,914, filed on Jan. 18, 2012.

(51) Int. Cl.
*G06F 1/16* (2006.01)
*H04M 1/02* (2006.01)

(52) U.S. Cl.
CPC ............ *G06F 1/1616* (2013.01); *G06F 1/1615* (2013.01); *H04M 1/0214* (2013.01); *Y10T 16/5386* (2015.01)

(58) Field of Classification Search
CPC ... G06F 1/1615; G06F 1/1616; G06F 1/1622; G06F 1/1681; G06F 1/1637; G06F 1/1679; H04M 1/0216; H04M 1/0214; Y10T 16/52; Y10T 16/5386; Y10T 16/538627
USPC .................. 361/679.27, 679.15, 679.06, 755; 174/542; 455/575.3
See application file for complete search history.

(56) References Cited

U.S. PATENT DOCUMENTS

| | | | |
|---|---|---|---|
| 4,825,395 A * | 4/1989 | Kinser et al. ............. | 361/679.09 |
| 5,168,426 A | 12/1992 | Hoving et al. | |
| 5,666,694 A * | 9/1997 | Slow et al. ...................... | 16/368 |
| 5,881,150 A * | 3/1999 | Persson .................... | 379/433.13 |
| 5,898,600 A * | 4/1999 | Isashi ............................ | 708/105 |
| 5,987,704 A | 11/1999 | Tang | |
| 6,154,359 A * | 11/2000 | Kamikakai et al. ....... | 361/679.27 |
| 6,665,175 B1 | 12/2003 | deBoer et al. | |
| 6,845,005 B2 | 1/2005 | Shimano et al. | |
| 7,123,472 B2 | 10/2006 | Huang et al. | |
| RE39,429 E | 12/2006 | Hawkins et al. | |
| 7,155,266 B2 * | 12/2006 | Stefansen .................. | 455/575.3 |
| 7,187,538 B2 | 3/2007 | Homer et al. | |
| 7,203,058 B2 | 4/2007 | Hong | |

(Continued)

OTHER PUBLICATIONS

"Lenovo Yoga Gives Notebook, Tablet Concepts a New Twist", [online]. Retrieved from the internet: <www.technewsworld.com/story/74168.html>, 3 pages, Jan. 12, 2012.

*Primary Examiner* — Adrian S Wilson
*Assistant Examiner* — Abhishek Rathod

(57) ABSTRACT

A computing device is provided herein. For instance, the computing device comprises base and lid assemblies, and a connector. The base assembly includes a base housing, a first hinge portion attached to the housing, a keyboard, a touch-based input surface, and an electronic component within the housing. The housing includes a first surface at least partly surrounding the keyboard and touch-based input, and a second opposing surface. The lid assembly includes a lid housing, a second hinge portion, and a display, and includes a first surface at least partly surrounding the display and a second surface opposite the first surface. The connector has a third hinge portion, a fourth hinge portion and a body extending therebetween. The third hinge portion is rotatably affixed to the first hinge portion of the base assembly, and the fourth hinge portion is rotatably affixed to the second hinge portion of the lid assembly.

19 Claims, 9 Drawing Sheets

(56) References Cited

U.S. PATENT DOCUMENTS

| | | |
|---|---|---|
| 7,283,355 B2 | 10/2007 | Han |
| 7,414,834 B2 * | 8/2008 | Ukonaho et al. ......... 361/679.55 |
| 7,433,179 B2 * | 10/2008 | Hisano et al. ............ 361/679.27 |
| 7,566,033 B2 | 7/2009 | Schwager et al. |
| 7,604,206 B2 * | 10/2009 | Jung et al. ..................... 248/133 |
| 7,667,959 B2 * | 2/2010 | Pelkonen ................. 361/679.27 |
| 7,900,323 B2 * | 3/2011 | Lin ................................. 16/366 |
| 8,248,764 B2 * | 8/2012 | Hassemer et al. ........ 361/679.01 |
| 8,522,401 B2 * | 9/2013 | Jin et al. ........................... 16/354 |
| 8,693,181 B2 * | 4/2014 | Tseng et al. ............. 361/679.27 |
| 8,978,966 B2 * | 3/2015 | Walsh et al. ................... 235/103 |
| 2004/0212956 A1 * | 10/2004 | Kuivas et al. ................. 361/683 |
| 2006/0148542 A1 | 7/2006 | Oliver |
| 2006/0264243 A1 * | 11/2006 | Aarras ......................... 455/566 |
| 2007/0151381 A1 * | 7/2007 | Pelkonen ....................... 74/437 |
| 2009/0025182 A1 * | 1/2009 | Hung ............................. 16/382 |
| 2009/0031529 A1 * | 2/2009 | Hung ............................. 16/223 |

\* cited by examiner

INVERTIBLE CLAMSHELL NOTEBOOK COMPUTER

CROSS-REFERENCE TO RELATED APPLICATIONS

The present application claims the benefit of the filing date of U.S. Provisional Patent Application No. 61/587,914 filed Jan. 18, 2012, the disclosure of which is hereby incorporated herein by reference.

BACKGROUND

Tablet and notebook computers are designed to be portable computing devices with specialized functionality. Notebook computers are designed to replicate the functionality of a desktop computer with a computer monitor in the form of a display screen integrated with traditional input in the form of a keyboard and trackpad. These components are often configured in a "clamshell" configuration wherein the screen in positioned in a lid housing that is rotatably affixed opposite a base housing that includes the keyboard and the trackpad (or other similar input) as well as other internal computer components. Clamshell computers can be "closed" for transportation and storage and can be opened with the keyboard, trackpad, and screen facing the user such that the screen is adjustable by tilting the lid housing.

Tablet computers often include a single body with internal computer components and a touch-sensitive screen at an external surface thereof. The touchsreen allows the user to interact with the display using touch with either the user's fingertips or a stylus. Tablets are generally intended for use on a flat surface or while being held by the user. Various cases, stands or other attachments can be used to hold a tablet in various other positions that users have found useful. The lack of a fixed keyboard, however, limits the use of tablet-type computers, particularly in their ability to facilitate the creation of content that requires a great deal of typing. Further, in some applications, interaction with the screen itself interferes with the user's ability to view the information on the screen. However, the simple design and potentially intuitive nature of tablet interfaces makes them desirable for other types of content creation and for content consumption.

Due to the distinct inherent advantages of each type of portable computer, attempts have been made to develop computers that can be reconfigured between traditional notebook computer modes and tablet modes. However, such attempts lack many functional aspects that are advantageous for users of those devices during use as either a tablet or notebook computer or during transition between such modes.

BRIEF SUMMARY

According to one aspect, a computing device is provided. The computing device comprises a base assembly, a lid assembly, and a connector. The base assembly includes a base housing, a first hinge portion attached to the housing, a keyboard, a touch-based input surface, and an electronic component within the housing. The housing further includes a first surface at least partly surrounding the keyboard and the touch-based input and a second surface opposite from the first surface. The lid assembly includes a lid housing, a second hinge portion, and a display. The lid housing includes a first surface at least partly surrounding the display and a second surface opposite the first surface. The connector has a third hinge portion, a fourth hinge portion and a body extending therebetween. The third hinge portion is rotatably affixed to the first hinge portion of the base assembly, and the fourth hinge portion is rotatably affixed to the second hinge portion of the lid assembly.

In one example, the body of the connector is rotatably affixed to the base housing by the rotatable affixation of the first hinge portion with the third hinge portion such that the connector is rotatable through about 180 degrees with respect to the base housing. In another example, the body of the connector is rotatably affixed to the lid housing by the rotatable affixation of the second hinge portion with the fourth hinge portion such that the connector is rotatable through about 180 degrees with respect to the lid housing.

In a further example, the lid housing is rotatably affixed to the base housing by the rotatable affixation of the first hinge portion with the third hinge portion and the affixation of the second hinge portion with the fourth hinge portion such that the lid housing is rotatable through about 360 degrees with respect to the base housing. In this case, the connector may be configured such that rotation of the lid housing relative to the base housing also causes translation of the lid housing in a direction perpendicular to the first surface of the base housing. Here, when the lid is rotated by 360 degrees with respect to the base housing, the lid may translate in the direction perpendicular to the first surface of the base housing through a distance approximately equal to a thickness of the base housing plus a thickness of the lid housing.

In another example, the device can be configured in a closed position such that the first surface of the lid housing faces the first surface of the base housing and such that the screen, keyboard, and touch-based input are not accessible for contact therewith by a user. In one alternative, the body of the connector includes an outside surface that is perpendicular to the second surface of the lid housing when the device is in the closed position. In another alternative, the computing device further includes retention means that are mutually engageable between the base housing and the lid housing to maintain the device in the closed position.

In yet another alternative, the device is further configurable in an easel position such that the first surface of the lid housing is positioned at an angle of between 310 and 330 degrees with respect to the first surface of the base housing. And when in the easel position, the device is positionable on a surface such that a front edge of the base housing and a front edge of the lid housing contact the surface. In this case, the device may further include retention mechanisms attached between each of the first and third hinge portions and the second and fourth hinge portions, the retention mechanisms being configured to releasably secure the notebook in the easel position. Here, the retention mechanisms may include a depression and a raised portion, each being respectively associated with the first or third and the second or fourth hinge portions, the depression and raised portion being mutually engagable when the device is moved into the easel position. Optionally, the raised portion is spring-biased.

In another example, the device is further configurable in a tablet position such that the second surface of the lid housing faces the second surface of the base housing and such that the screen and keyboard are exposed on opposite sides of the device. In this case, the electronic component may include a sensor configured to determine when the device is in the tablet position and to output a signal in response thereto, the component further including a processor adapted to receive the signal from the sensor and executing a command to disable a keyboard function in response thereto. Here, the device may further include a gyroscopic sensor configured to determine an orientation of the device, wherein the processor is further adapted for executing a command to utilize the gyroscopic sensor to orient an image presentable on the display in response to the determined orientation upon receiving the signal from the sensor.

And in another alternative, the connector includes means for synchronizing rotation of the lid with respect to the connector with rotation of the base with respect to the connector.

According to another aspect, a computing device comprises a base assembly, a lid assembly and a connector. The base assembly includes a base housing, a keyboard, a touch-based input surface, and an electronic component within the housing. The housing further includes a first surface surrounding the keyboard and the touch-based input and a second surface opposite from the first surface and defining a front edge of the base housing. The lid assembly includes a lid housing, and a display. The lid housing includes a first surface surrounding the display and a second surface opposite the first surface and defining a front edge of the lid housing. The connector is rotatably affixed between the base assembly and the lid assembly to alternately permit rotation of the lid assembly with respect to the base assembly and to retain the device in an easel position such that the first surface of the lid housing is positioned at an angle of between 310 and 330 degrees with respect to the first surface of the base housing. And when in the easel position, the device is positionable on a surface such that a front edge of the base housing and a front edge of the lid housing contact the surface.

In one example, the front edge of the lid housing and the front edge of the base housing are adjacent front surfaces of the lid housing that are angled with respect to their respective first surfaces to be parallel to a surface when the device is positioned thereon. In another example, the base assembly includes a first hinge portion, the lid assembly includes a second hinge portion, and the connector has a third hinge portion, a fourth hinge portion and a body extending therebetween, wherein the third hinge portion is rotatably affixed to the first hinge portion of the base assembly, and wherein the fourth hinge portion is rotatably affixed to the second hinge portion of the lid assembly.

In yet another example, the device further includes retention mechanisms attached between each of the first and third hinge portions and the second and fourth hinge portions, the retention mechanisms being configured to releasably secure the notebook in the easel position.

In a further example, the electronic component includes a sensor configured to determine when the device is in the easel position and to output a signal in response thereto. Here, the component further includes a processor adapted to receive the signal from the sensor and executing a disabling command to ignore at least one of a keyboard and a trackpad function in response thereto. In one alternative, the processor is further adapted to receive an override command for the disabling command. And in another alternative, the processor is further adapted for executing a display orientation command in response to the determined orientation upon receiving the signal from the sensor.

DETAILED DESCRIPTION

Figure 1:
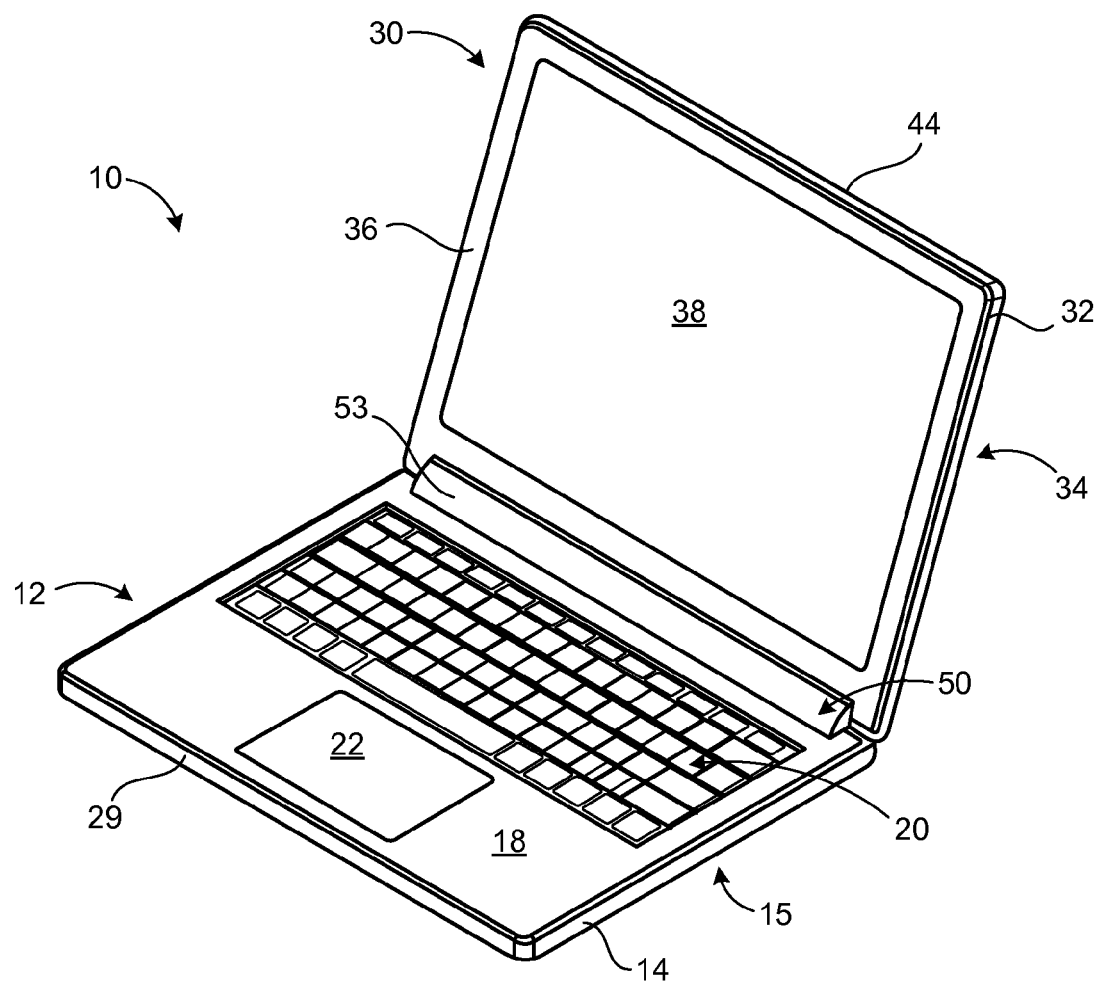
FIG. 1 shows a computer according to an aspect of the present disclosure in a first configuration.

Embodiments of the present disclosure are described herein with reference to the drawing figures. FIG. 1 illustrates an example of an embodiment of a notebook computer 10 that has many aspects thereof, including a base unit 12 and a lid unit 30 that is connected to the base unit 12 in such a way that the lid 30 is rotatable with respect to the base 12. The base unit 12 includes a base housing 14 that includes a lower surface 16 and a deck surface 18 that is opposite and generally parallel to lower surface 16. Input devices, which can include a keyboard 20 and a touch-based input such as a trackpad 22 (which can also be referred to as a touchpad or the like) can be affixed to the base housing 14 and exposed for access by a user on deck surface 18. The base housing 14 can also include additional components of computer 10 such as various electronic structures including the computer's central processing unit, various internal memory structures, batteries, graphics cards, cooling mechanisms, and structures for making various external connections with the computer's internal components (including a power port, USB, firewire, or thunderbolt ports, audio input and output ports, and slots for receiving additional memory cards or the like). The base housing 14 can also include openings appropriate for access to such connection structures.

Lid unit 30 includes a lid housing 32 that has an upper surface 34 and a bezel surface 36. A display unit 38, that can be in the form of an LCD, LED, OLED, or AMOLED video display or the like, can be attached to lid housing 32 that is exposed for viewing by the user at the bezel surface 36 such as through an opening therein. Display 38 can be in the form of a touchscreen configured to simultaneously present a viewable image and receive touch-based inputs from a user along the viewing surface thereof. The touchscreen, in connection with specialized software in the computer's memory, can detect user touch and movement thereacross as well and can recognize various "clicks" and other gestures made by the user on the screen. Various known touchscreen configurations can be used for display 38 including those with capacitive, resistive, or surface acoustic wave sensing structures.

Figure 2:
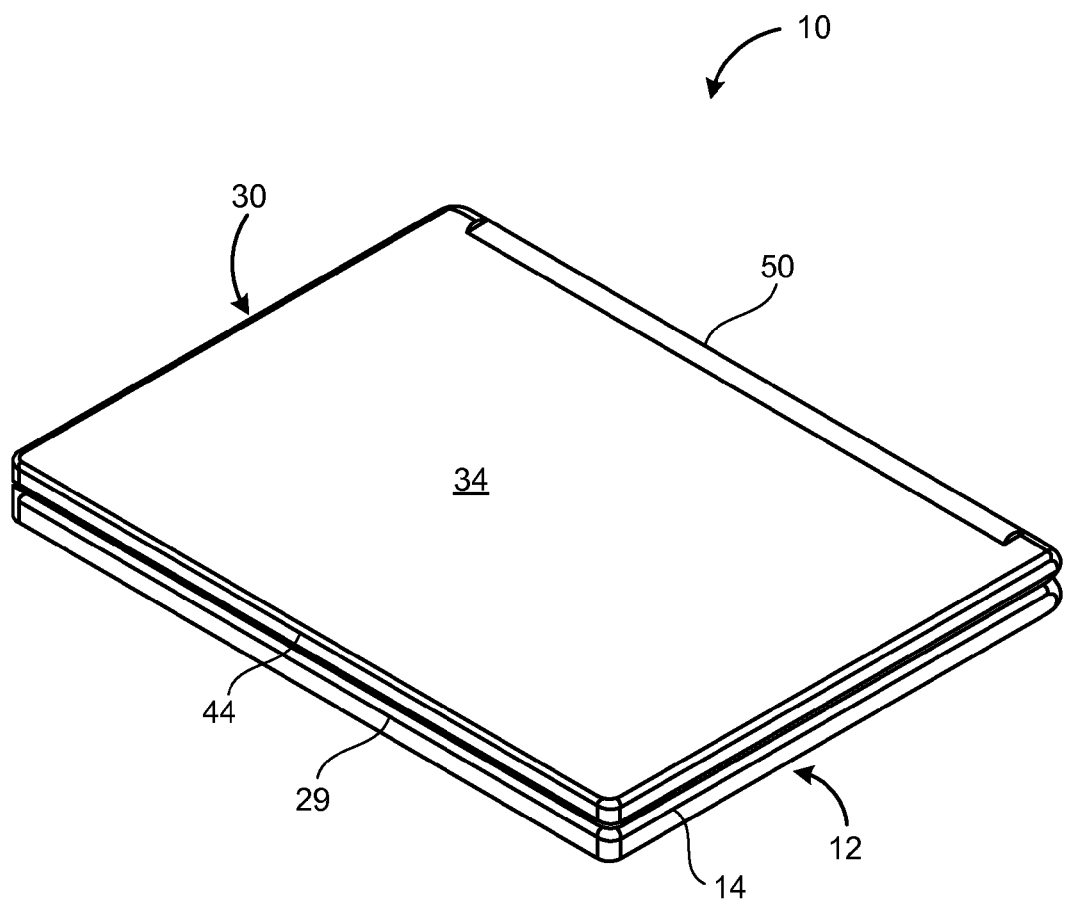
FIG. 2 shows the computer of FIG. 1 in a further configuration.

The rotatable attachment of lid unit 30 to base unit allows for the computer 10 to be configured in different positions, including a "closed" position, as shown in FIG. 2, in which the bezel surface 36 is placed adjacent to deck surface 18 with the upper surface 34 of the lid housing 32 and lower surface 16 of the base housing 14 generally parallel to each other and spaced apart over a total thickness of the computer 10. This configuration can be used during storage or transportation of computer 10, as it is a compact position with display 38, keyboard 20, and touchpad 22 protected from accidental actuation or damage during transpiration. During use, the lid unit 30 can be rotated with respect to the base unit 12 into any of an infinite number of positions that position the display 38 facing the user in a comfortable viewing position for the user with the base unit 12 resting on a surface or supported by the user (such as on the user's lap) with the keyboard 20 and touchpad 22 positioned for use. Such a configuration is shown in FIG. 1 and is generally referred to herein as a "laptop" configuration.

In the present example, lid unit 30 is affixed to base unit 12 by a multi-hinge connector 50 that is configured to allow lid unit 30 to rotate beyond a range generally used in the laptop configuration and up to 360° with respect to the base unit 12. This allows computer 10 to be positioned in additional configurations that are described herein. An example of a hinge mechanism including an exemplary connector 50 is shown in FIG. 1. In the present example, a single connector 50 has a body 52 that extends across a majority of the width of both the lid housing 32 and the base housing 14. The body 52 of connector 50 is received within cutouts 54 in the lid housing 32 and the base housing 14. The cutouts 54 can be appropriately shaped to allow for the desired rotation between lid unit 30 and connector 50 as well as between base unit 12 and connector 50.

In the example shown in the Figures, computer 10 can include a single connector 50 that extends along at least about 60% of the width thereof. In a further example, connector 50 can be centered with respect to base 12 and lid 30 and can extend through up to at least about 90% of the width thereof. Cutouts in lid housing 32 and base housing 14 can be sized to correspond to the width of connector 50. The use of a single connector that extends through at least 60% of the width of the computer 10 can provide desirable levels of stability in the connection between base 12 and lid 30. Additionally, such a connector 50 can provide adequate internal space to house various electronic components, such as WiFi antennas or the like. In another example, connector 50 can be adequately sized to provide a dock for a stylus or the like that can be used in connection with screen 38 such that stylus can be available for removal from connector 50 when computer 10 is at least in the tablet configuration (FIG. 4), but is enclosed within computer 10 when in the closed configuration. In other embodiments, multiple connectors can be used that have narrower bodies than shown in the figures. Such connectors can be spaced apart along multiple locations through the width of the lid and base assemblies that can have multiple cutouts to accommodate the connectors.

Connector 50 in the present example is rotatably affixed to lid housing 32 at the lateral ends of the connector 50. Further, connector 50 is rotatably affixed to the base housing 14 in locations that mirror the connection between connector 50 and lid housing 32. Connector 50 is sized to extend between lid housing 32 and base housing 14, as shown in FIG. 2, when computer 10 is in the closed configuration. The connections between the connector 50 and the lid 32 and base housings 14, respectively can be centered at a halfway point between the thickness of each housing 14,32 with the overall height of connector 50 being sized to accommodate such a connection arrangement. The connector arrangement shown can permit computer to be positioned in the laptop and closed configurations described above and shown in FIGS. 1-3.

Figure 3:
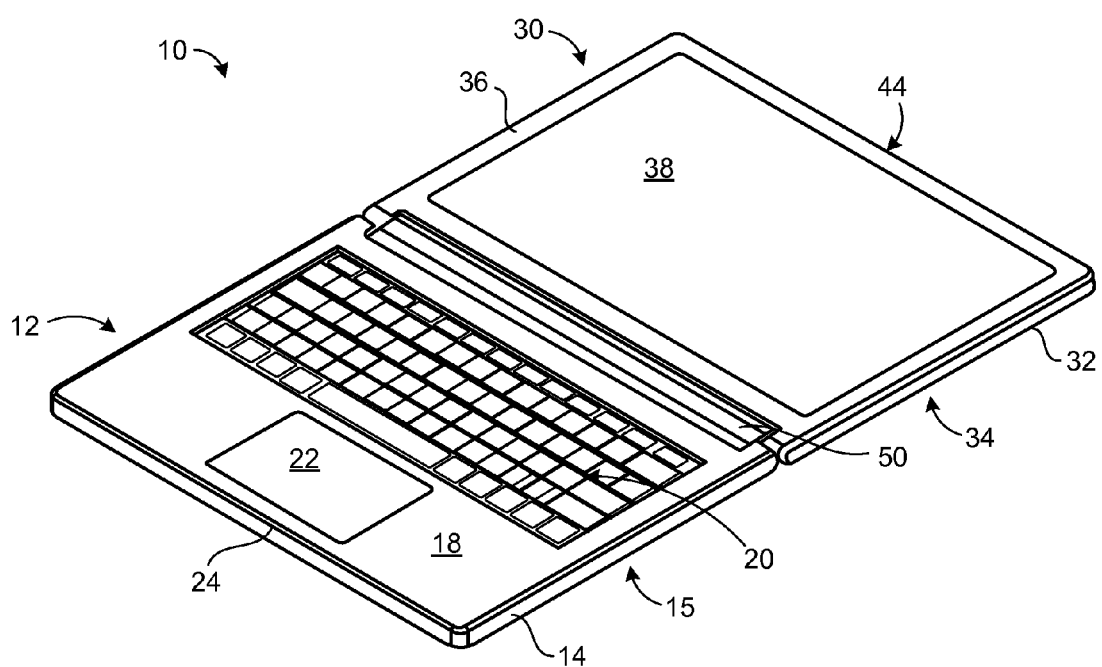
FIG. 3 shows the computer of FIG. 1 in another configuration.

Additionally, the rotational attachment between lid unit 30 and base unit 12 using connector 50 can allow for additional usage configurations. As shown in FIG. 3, lid unit 30 can be rotated 180° with respect to base unit 12 (as measured between bezel surface 36 and deck surface 18) such that upper surface 34 of lid housing 32 and lower surface 16 of base housing can both lie along a surface. It is noted that in an embodiment where base housing 14 includes elastomeric feet 28 or the like along lower surface 16, lid housing 32 can also include feet (not shown) on upper surface 34 thereof such that lower surface 16 and upper surface 34 are substantially flush. In an embodiment where lid housing 32 and base housing 14 have a generally equal thickness, bezel surface 36 and deck surface 16 can also be substantially flush when computer 10 is in the flat position, although arrangements where lid housing 32 is thinner than base housing 14 are possible.

Figure 4:
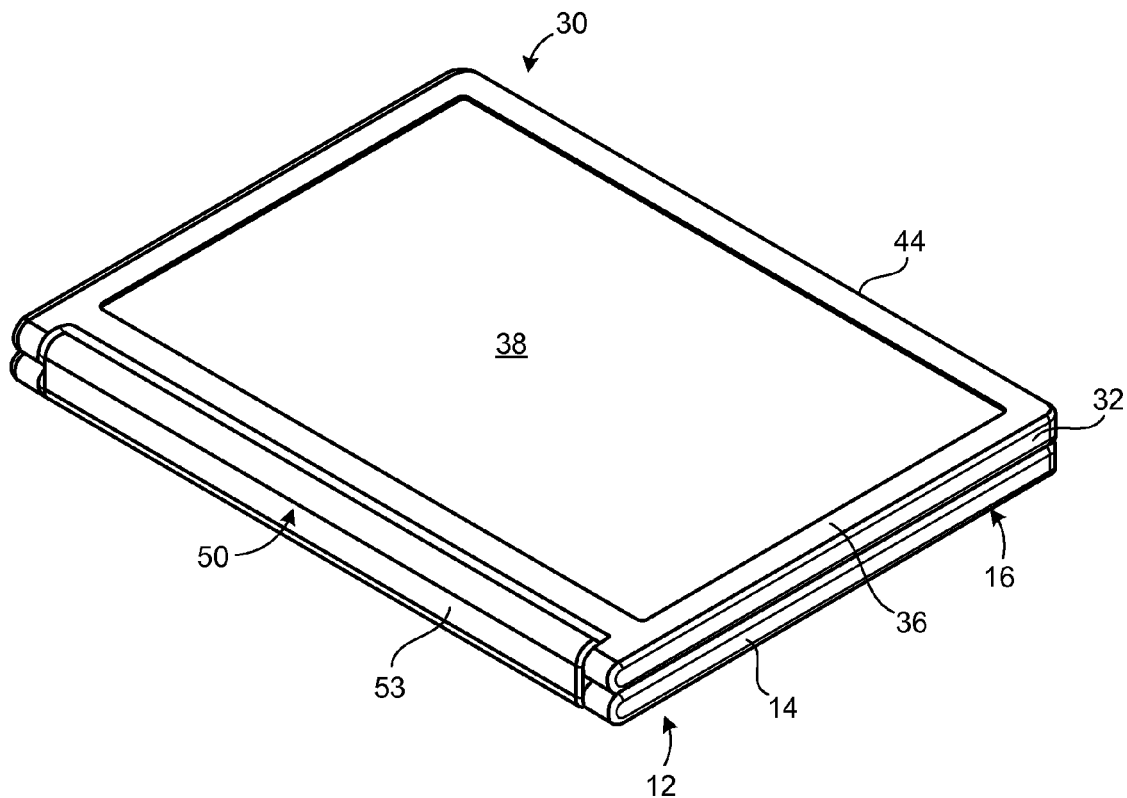
FIG. 4 shows the computer of FIG. 1 in yet another configuration.

As shown in FIG. 4, the above-described hinge mechanism including connector 50 or variations thereof can allow lid unit 30 to be rotated to 360° from the closed position and into the "tablet" configuration shown. In this configuration, both the lid unit 30 and the base unit 12 are inverted such that the upper surface 34 of the lid housing 32 is adjacent the lower surface 16 of base housing 14 with bezel surface 36 and deck surface 18 being positioned on the outside of the computer 10. In this configuration, computer 10 can be used as a tablet device where the user interacts with the touchscreen display 38 with the keyboard 20 and trackpad 22 facing away from the user. In this configuration computer 10 can be held by the user or can be positioned on a surface. Features (not shown) similar to feet 28 can also be positioned on deck surface 18 for use in such a configuration (and to appropriately space apart bezel surface 36 and deck surface 18 when the computer 10 is closed). Further, it may be advantageous for keyboard 20 and trackpad 22 to be somewhat recessed relative to deck surface 18 to prevent damage thereto when computer 10 is positioned on a surface in the tablet configuration.

Figure 5A:
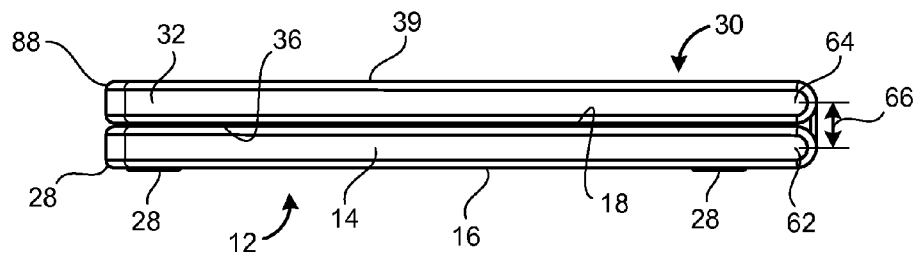
FIGS. 5A-5C show side views of the computer of FIG. 1 in the configurations of FIGS. 2, 3, and 4.
Figure 5B:
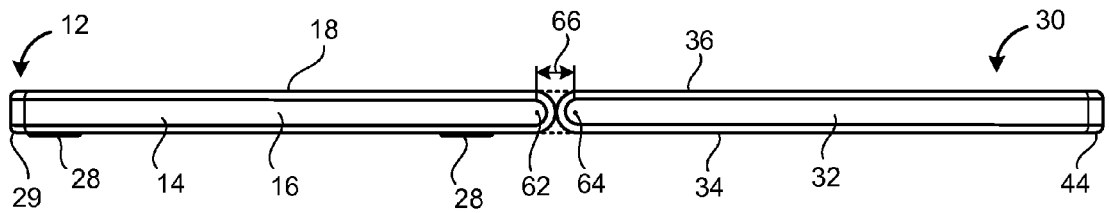
Figure 5C:
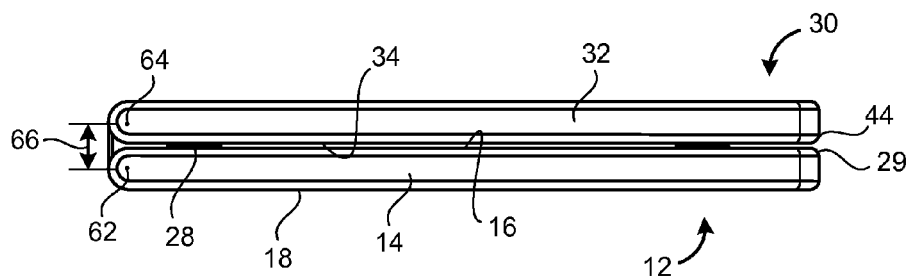

As shown in FIGS. 5A-5C, the configuration of connector 50 can accommodate the full 360° rotation of lid unit relative to base unit 12 due to the spacing between its connections with lid housing 32 and base housing 14, respectively. As shown, the connection point 62 of connector 50 to base housing 14 and the connection point 64 of connector 50 with lid housing 32 are each positioned at about the halfway point through the thickness of the lid housing 32 and the base housing 14, respectively. Further, the connection points 62,64 can be spaced apart vertically when the computer 10 is in the closed position (FIG. 5A) at a distance 66 that is at least equal to half of the overall thickness of the computer 10. This distance can be slightly greater to accommodate tolerances or to accept any spacers or feet on either bezel surface 36 of deck surface 18. When the computer 10 is moved into the flat configuration (FIG. 5B), the distance 66 between connection points 62,64 can horizontally space apart lid unit 30 and base unit 14 to allow them to rest flush on a common surface. Further, when in the tablet configuration (FIG. 5C), the lid unit is translated vertically compared to when in the closed position by the rotation of connector 50, the translation being equal to the distance 66.

Computer 10 can also be configured in an "easel" configuration by positioning lid unit 32 relative to base unit 12 such that display 38 faces away from keyboard 20 but such that the computer 10 is not yet in the tablet configuration. For example, the easel configuration can be such that bezel surface 36 is at an angle of between about 310° and 330° with respect to the deck surface 18. This configuration can position the respective top-front and bottom-front edges of the lid housing 32 and the base housing 14 at a distance sufficient to give computer 10 a base that can support it in the upright position shown in FIGS. 6A and 6B with connector 50 positioned vertically at the top of the configuration. This can allow for use of the computer as a tablet through interaction with the touchscreen display 38 while the computer is in a self-supported position with the display 38 elevated. This configuration can be used to display video, slideshows or the like with keyboard 20 and trackpad 22 out of the way. It can also allow for self supported use in tight spaces.

Various examples of computer 10 can include features to help maintain the position in the easel configuration against the weight of computer 10 and against the force of the user's interaction with touchscreen display 38. For example, as shown in FIG. 6C, the front surfaces 127 and 145 of base housing 114 and lid housing 132, respectively, can be angled such that they can be parallel to a surface 102 (such as a desktop or the like) when computer 110 is positioned thereon in the easel configuration. Additionally or alternatively, the front surfaces 127,145 or the edges 129,144 thereof can include elastomeric members configured to increase friction with a surface to help hold the easel position.

Figure 7:
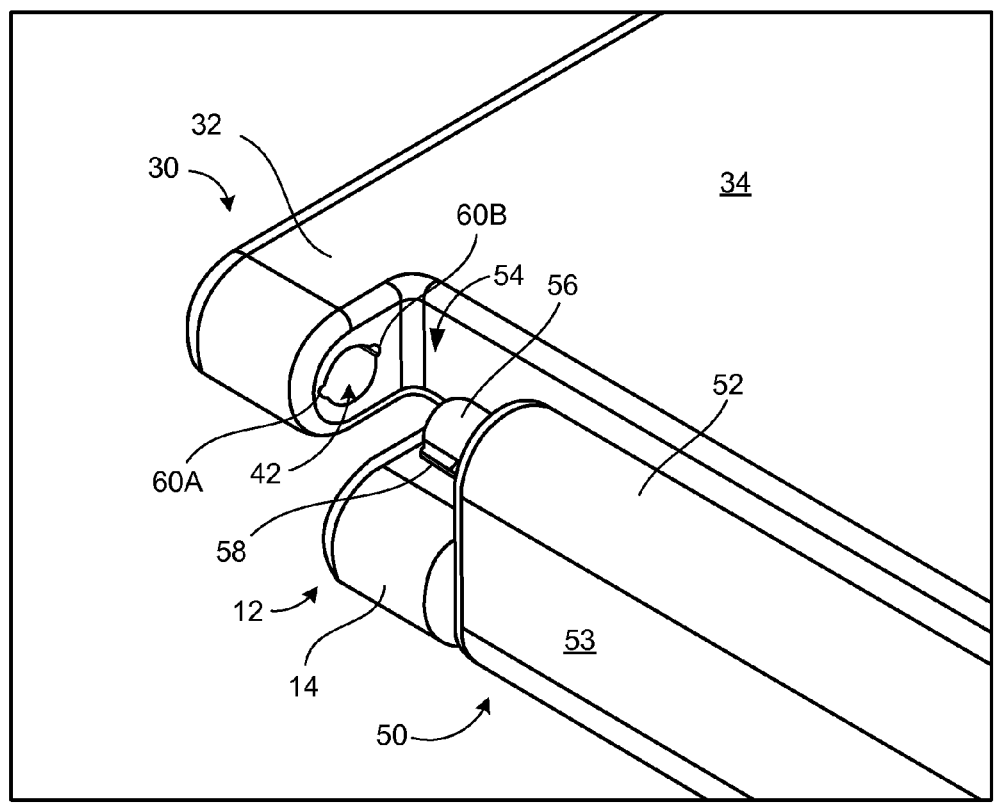
FIG. 7 shows an exploded detail view of a portion of the computer of FIG. 1.

The hinge mechanism can also include mechanical features to help maintain the easel position. An example of such a feature is shown in FIG. 7, where the connector is shown having a boss 56 that engages with a hole 42 formed by lid housing 14. Other features or mechanisms can be used to rotatably connect connector 50 to lid housing 14, and the example shown can also include additional components or features such as washers, bearings, or other components to control the friction within the hinge mechanism. The features can also include cable routing or heat transfer features between connector 50 and lid unit 30. Similar features can connect connector 50 to base housing 14 and can further include cable routing or heat transfer features between connector 50 and base unit 12.

In the example shown, boss 56 can include a spring-biased or resiliently deformable pawl 58 that can extend beyond the radius of boss 56 and can be depressed to recede into boss 56. Hole 42 can include one or more detents 60, e.g., 60A and 60B, that are sized to receive pawl 58 when in the extended position. This arrangement can be such that boss 56 can rotate freely within hole 42 with boss held in the depressed position by the wall of hole 42. When lid unit 30 is rotated such that detent 60 aligns with pawl 58, pawl 58 will move into its natural extended position and into detent 60. The outwardly-biased force of pawl 58 can increase the amount of force to rotate lid unit 30 in either direction to an amount greater that the friction of the hinge assembly alone. Similar features can be implemented between the connector 50 and the base housing 14 such that various positions between connector 50 and base unit 12 can be similarly maintained.

In the example shown in FIG. 7, hole 42 includes multiple detents 60 that can provide retention forces for multiple positions, such as those discussed above. Detent 60 A is positioned to align with pawl 58 when the lid unit 30 is positioned at 90° with respect to the back surface 53 of the connector. If a detent 60 is similarly positioned between connector 50 and base housing 14, then the result can be to help maintain computer 10 in the closed position. Detent 60B can be positioned along hole 58 at a location between about 155° and 165° relative to detent 60A. When similarly implemented in the base (in essentially a mirror-image position about horizontal plane), the arrangement can help maintain computer 10 in a desired configuration for the easel configuration. For example, if an easel position is desired wherein the bezel surface 38 is at an angle of 320° with respect to the deck surface 18, detent 60B can be positioned such that pawl 58 will engage detent 60B after rotation of lid housing 32 form the closed position relative to connector 50 through an angle of 160°. Similarly positioning a corresponding detent in base housing 14 can provide for the desired easel position retention. Additional detents can be included to provide similar retention of computer 10 in the flat (clockwise 90° from detent 60A) and tablet (180° from detent 60A) configurations.

Alternative structures can be used to attach lid housing 32 or base housing 14 to connector 50, which can include alternative retention features with similar geometric locations or similar structural principles. The hole 42 and boss 56 can be reversed with the hole positioned in connector 50, for example. Further, both the lid housing 32 and connector 50 can include holes with single or the like extending therethrough. Such a rod can extend completely through connector 50 and into a mating hole on the opposite side of lid housing 32. In such an arrangement, the retention features can, for example, be included within connector body 52. Such attachment features can further be linked such as by gears or the like, which can be contained within housing 32, so as to cause lid unit 30 to rotate relative to connector 50 at the same rate as connector 50 relative to base unit 12 when, for example, a user moves lid unit 30.

Computer 10 can have various forms of software or firmware stored in its memory that can implement various functions or execute various commands that can enable improved use of computer 10 when configured in or moved between the various positions described herein. In an example software stored in the memory of computer 10 and configured to be run by the processor of computer 10 can control the orientation of the image presented on display 38 or enable and disable keyboard 20 or trackpad 22 depending on the position of computer 10, as determined by various sensors or switches from which the processor collects information.

In an example, a sensor, such as a magnetic sensor can be positioned in base housing 14, for example within the attachment to connector 50. A series of magnets can also be positioned within the mating attachment feature in connector 50 at locations determined to correspond to the position of computer 10 based on the degree of rotation of connector 50 relative to base unit 12. Based on the information collected from the sensor, the software, which can be a part of the computer's operating system or within application-specific software, can, for example, orient the display 38 image in an upright position when the computer is in the laptop position. The software can also enable the keyboard 20 and trackpad 22 for normal use. When the computer 10 is in the closed position, the software can cause the display 38 as well as the keyboard 20 and trackpad 22 to be deactivated.

In further examples, when the software determines that the computer 10 is in the flat position (as shown in FIG. 3), the display can be reoriented for viewing by a person positioned opposite from base unit 12, which can include rotating the display 180° from the orientation in the laptop position. Alternatively, the display can be oriented at 90° in either direction from the orientation in the laptop position. Either of these re-orientations can be done automatically accordingly to system, software, or user preferences or by a command executed by a user response to a prompt presented in response to the software's position determination. An additional prompt can allow the user to cause the software to display a virtual keyboard on the display to allow simultaneous input by two users on opposite sides of base unit 12.

Figure 6A:
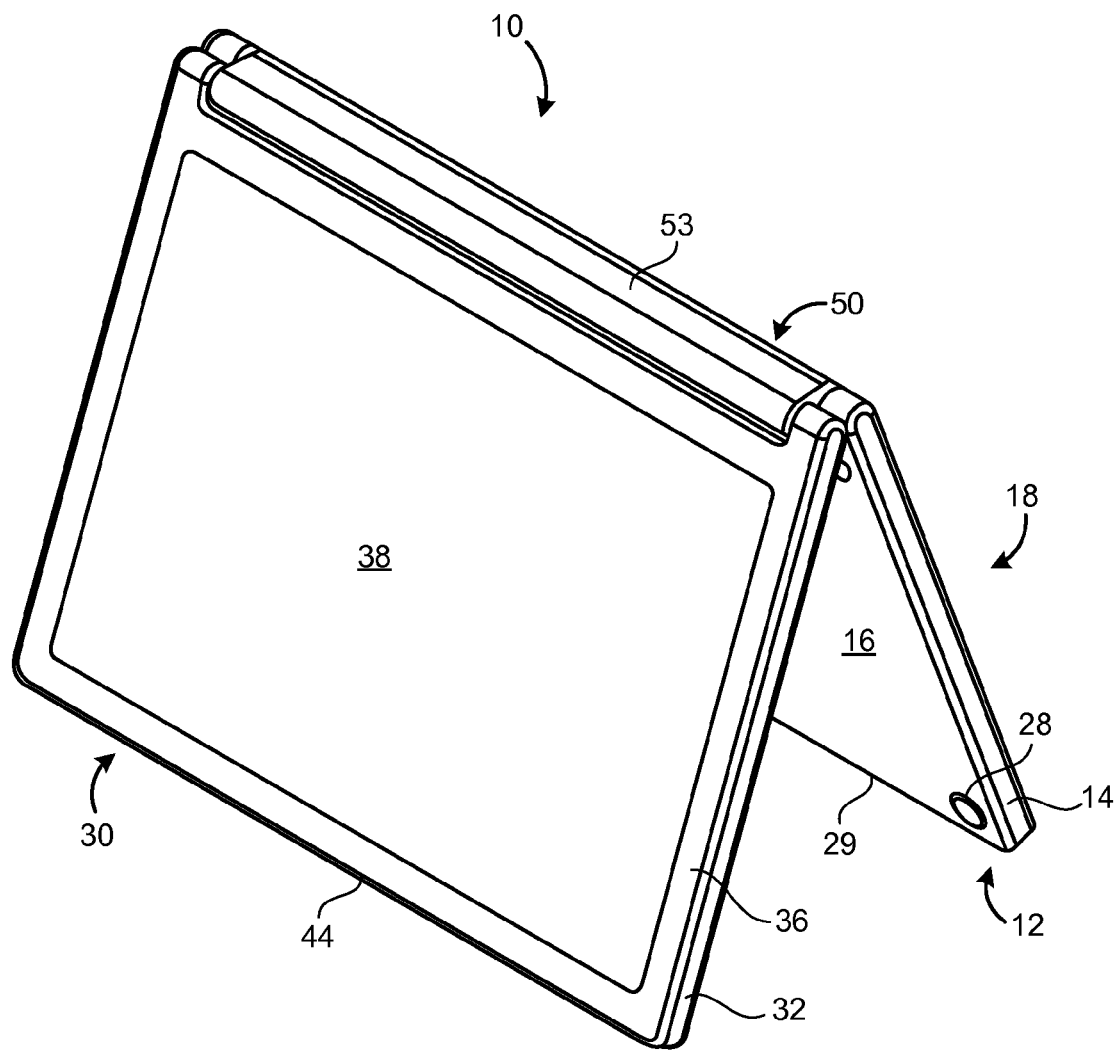
FIG. 6A shows a front view of the computer of FIG. 1 in a further configuration.
Figure 6B:
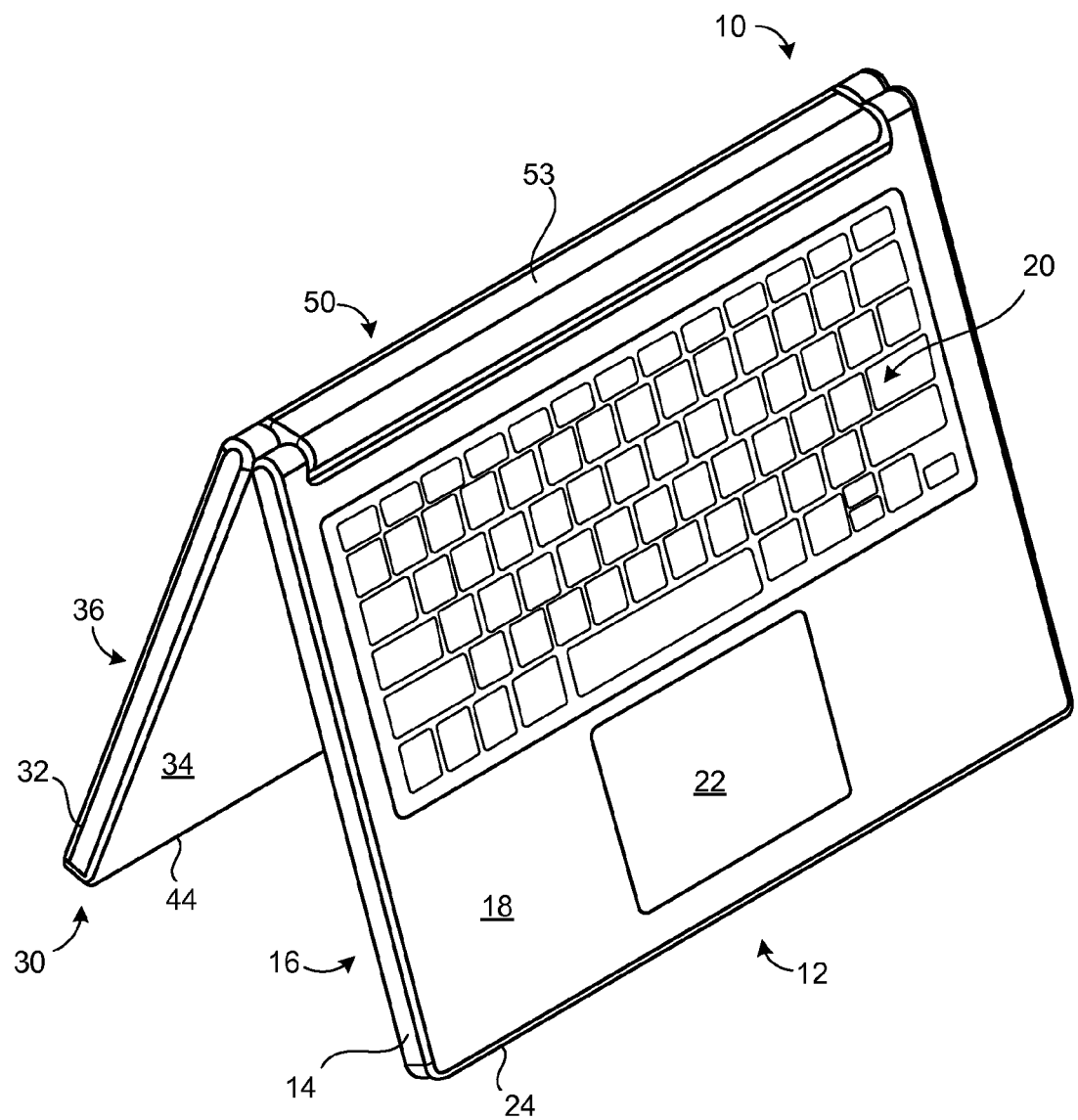
FIG. 6B shows a rear view of the configuration of FIG. 6A.
Figure 6C:
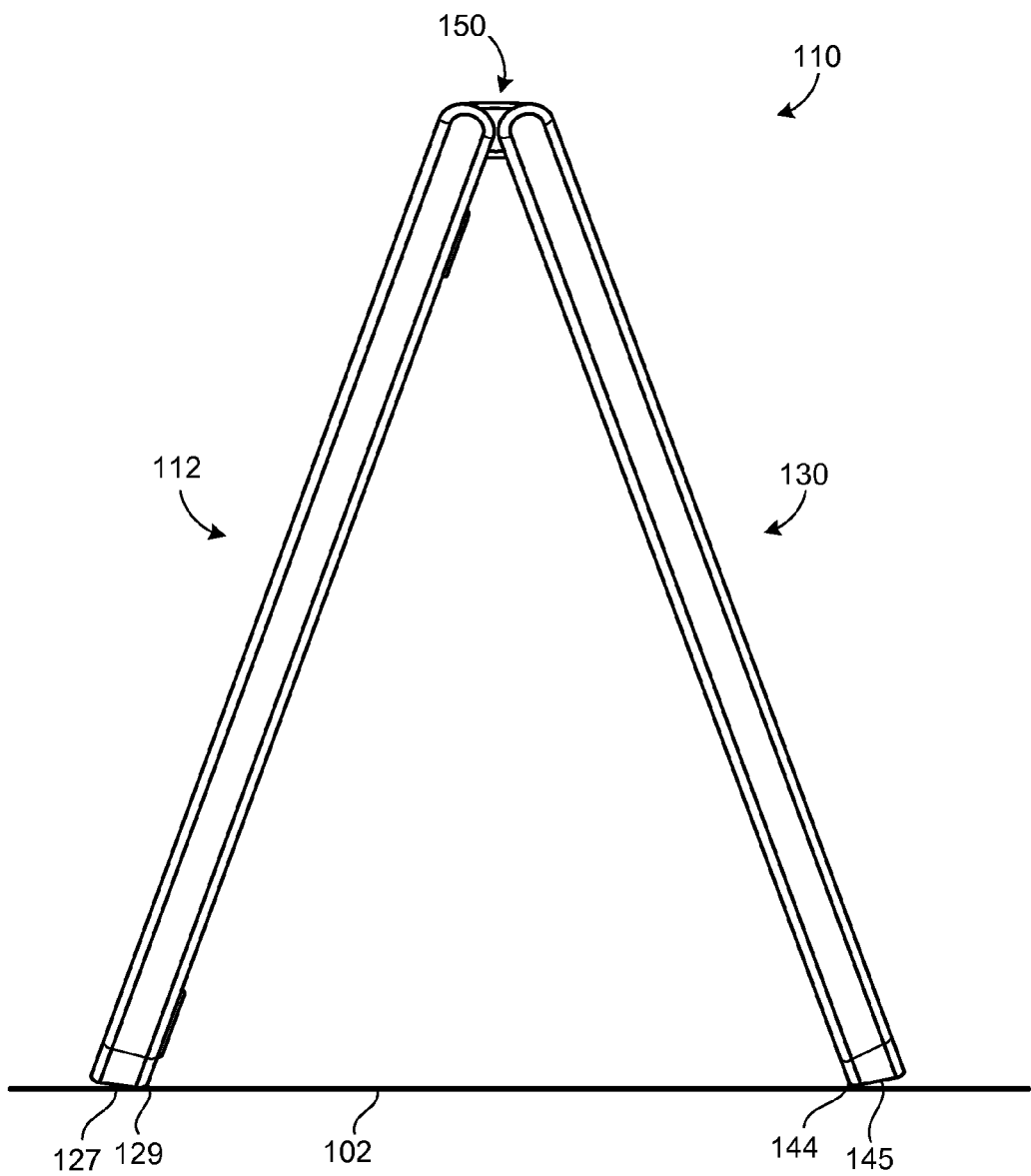
FIG. 6C shows a side view of an alternative axample of a computer according to an aspect of the disclosure.

When the software has determined that the computer 10 is in the easel position (as shown in FIGS. 6A and 6B, above) can also rotate the display to 180° from the orientation in the laptop configuration. This can be done automatically based on the feedback from a sensor to sense the laptop position (as described above, for example, or based on feedback from an additional sensor in lid unit 30 that is enabled when the computer 10 is in the easel position. The gyroscopic sensor can be configured to determine the orientation of the lid unit 30 and can appropriately orient the display based thereon according to known conventions. This can allow for viewing of an upright image in the landscape mode when in the orientation shown in FIG. 6A. It can also re-orient the display 38 image when computer 10 is rotated 90° from the FIG. 6A position (with deck surface 18 placed on a work surface) in an elevated tablet position. It can also orient the display 38 image in a portrait mode when the computer 10 is stood upright in the easel position (resting on its sides) in a "book" mode. Any of these re-orientations can be done automatically based on position sensing or upon user-selection or confirmation upon a prompt in response to position sensing.

The position sensing described above can also cause the keyboard 20 or trackpad 22 to be disabled when the computer is in the easel position to prevent accidental or unintentional actuation thereof. Various actions can override this disabling to enter into a "presentation mode" or the like. Such actions can include a double-click on the trackpad or spacebar, for example, or depressing a specific key combination, or depressing a virtual button on the touchscreen display 38. In the presentation mode, the keyboard and trackpad can be active to allow a presenter on the keyboard 20 side to control images presented on display 38 to others.

When the software determines that computer 10 is in the tablet mode, it can allow gyroscopic display orientation, as described above, and can disable the keyboard and trackpad to allow the user to hold computer 10 without actuating either input.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A computing device, comprising:
   a base assembly;
   a lid assembly; and
   a hinge mechanism rotatably connecting the base assembly to the lid assembly, the hinge mechanism including:
      a boss including a spring-biased pawl extending beyond a radius of the boss; and
      a hole to engage the boss such that the boss can rotate within the hole, the hole defining a detent sized to receive the spring-biased pawl;
      the boss to rotate freely within the hole in response to the spring-biased pawl being held in a depressed position by a wall of the hole; and
      the spring-biased pawl to move into an extended position into the detent in response to the detent aligning with the spring-bias pawl, the movement of the spring-biased pawl into the extended position in the detent increasing an amount of force required to rotate the lid assembly with respect to the base assembly to an amount of force greater than a friction of the hinge mechanism when the spring-biased pawl is held in the depressed position.

2. The computing device of claim 1, wherein the hinge mechanism further comprises:
   a first hinge portion affixed with the base assembly;
   a second hinge portion affixed with the lid assembly, the second hinge portion including the hole of the hinge mechanism;
   a third hinge portion rotatably affixed to the first hinge portion; and
   a fourth hinge portion rotatably affixed to the second hinge portion, the fourth hinge portion including the boss of the hinge mechanism.

3. The computing device of claim 2, wherein the hinge mechanism is rotatably affixed to the lid assembly by the rotatable affixation of the second hinge portion with the fourth hinge portion such that the hinge mechanism is rotatable through about 180 degrees with respect to the lid assembly.

4. The computing device of claim 2, wherein the lid assembly is rotatably affixed to the base assembly by the rotatable affixation of the first hinge portion with the third hinge portion and the affixation of the second hinge portion with the fourth hinge portion such that the lid assembly is rotatable through about 360 degrees with respect to the base assembly.

5. The computing device of claim 4, wherein the hinge mechanism is configured such that rotation of the lid assembly relative to the base assembly also causes translation of the lid assembly in a direction perpendicular to the base assembly.

6. The computing device of claim 5, wherein when the lid assembly is rotated by 360 degrees with respect to the base assembly, the lid assembly translates in the direction perpendicular to the base housing through a distance approximately equal to a thickness of the base assembly plus a thickness of the lid assembly.

7. The computing device of claim 2, wherein the hinge mechanism is rotatably affixed to the base assembly by the affixation of the first hinge portion with the third hinge portion such that the hinge mechanism is rotatable through about 180 degrees with respect to the base assembly.

8. The computing device of claim 1, wherein the computing device can be configured in a closed position such that a first surface of the lid assembly faces a first surface of the base assembly and such that a display included in the lid assembly, a keyboard included in the base assembly, and a touch-based input included in the base assembly are not accessible for contact therewith by a user.

9. The computing device of claim 8, wherein the computing device is further configurable in a tablet position such that a back surface of the lid assembly faces a bottom surface of the base housing and such that a display included in the lid assembly and a keyboard included in the base assembly are exposed on opposite sides of the computing device.

10. The computing device of claim 9, wherein:
    the hinge mechanism includes a sensor configured to determine when the computing device is in the tablet position and to output a signal in response thereto, and
    the computing device is configured to receive the signal from the sensor and to execute a disabling command to disable a keyboard function in response thereto.

11. The computing device of claim 10, wherein the computing device is further adapted to receive an override command for the disabling command.

12. The computing device of claim 1, wherein the pawl and detent are positioned so that when the detent receives the pawl, the computing device is further in an easel position such that the lid assembly is positioned at an angle of between 310 and 330 degrees with respect to the base assembly, and wherein when in the easel position, the computing device is positionable on a surface such that a front edge of the base housing contacts the surface and a front edge of the lid housing contacts the surface.

13. The computing device of claim 1, wherein the spring-biased pawl includes a first spring-biased pawl and the boss includes a second spring-biased pawl aligned with the first spring-biased pawl.

14. The computing device of claim 1, wherein the hinge mechanism includes means for synchronizing rotation of the lid assembly with respect to the hinge mechanism with rotation of the base assembly with respect to the hinge mechanism.

15. The computing device of claim 1, wherein the hinge mechanism extends through a distance that is at least 60% of a width of the base assembly.

16. The computing device of claim 1, wherein the hole is included in the lid assembly.

17. A computing device, comprising:

a base assembly including a base housing, a keyboard, and a touch-based input attached to the base housing, the base housing further including a first surface surrounding the keyboard and the touch-based input and a second surface opposite from the first surface and defining a front edge of the base housing;

a lid assembly including a lid housing and a display affixed with the lid housing, the lid housing including a first surface surrounding the display and a second surface opposite the first surface and defining a front edge of the lid housing; and a hinge mechanism affixed between the base assembly and the lid assembly to permit rotation of the lid assembly with respect to the base assembly and to selectively retain the computing device in an easel position such that the first surface of the lid housing is positioned at an angle of between 310 and 330 degrees with respect to the first surface of the base housing, and wherein, when in the easel position, the computing device is positionable on an easel surface such that a front edge of the base housing contacts the easel surface and a front edge of the lid housing contacts the easel surface, the hinge mechanism including:

a boss including a spring-biased pawl extending beyond a radius of the boss; and a hole to engage the boss such that the boss can rotate within the hole, the hole defining a detent sized to receive the spring-biased pawl, the detent and the pawl being positioned to retain the computing device in the easel position;

the boss to rotate freely within the hole in response to the spring-biased pawl being held in a depressed position by a wall of the hole; and the spring-biased pawl to move into an extended position into the detent in response to the detent aligning with the spring-biased pawl, the movement of the spring-biased pawl into the extended position in the detent increasing an amount of force required to rotate the lid assembly with respect to the base assembly to an amount of force greater than a friction of the hinge mechanism when the spring-biased pawl is held in the depressed position.

18. The computing device of claim 17, wherein:

the base assembly includes a first hinge portion, the lid assembly includes a second hinge portion, and the hinge mechanism has a third hinge portion, a fourth hinge portion, and a body extending therebetween, the third hinge portion being rotatably affixed to the first hinge portion of the base assembly, and the fourth hinge portion being rotatably affixed to the second hinge portion of the lid assembly.

19. A computing device, comprising:

a base assembly including a base housing, a keyboard, and a touch-based input attached to the base housing, the base housing further including a first surface at least partly surrounding the keyboard and the touch-based input, a second surface opposite the first surface, and a rear wall extending between the first and second surfaces through a width of the base housing, a recess being defined in the rear wall, and a first hinge portion being defined in the base housing within the rear wall;

a lid assembly including a lid housing, a second hinge portion affixed with the lid housing, and a display affixed with the lid housing, the lid housing including a first surface at least partly surrounding the display and a second surface opposite the first surface; and a connector having a third hinge portion, a fourth hinge portion and a hinge mechanism rotatably connecting the third hinge portion to the fourth hinge portion, the third hinge portion being rotatably affixed to the first hinge portion of the base assembly, the fourth hinge portion being rotatably affixed to the second hinge portion of the lid assembly, the hinge mechanism including:

a boss including a spring-biased pawl extending beyond a radius of the boss; and a hole to engage the boss such that the boss can rotate within the hole, the hole defining a detent sized to receive the spring-biased pawl;

the boss to rotate freely within the hole in response to the spring-biased pawl being held in a depressed position by a wall of the hole; and the spring-biased pawl to move into an extended position into the detent in response to the detent aligning with the spring-biased pawl, the movement of the spring-biased pawl into the extended position in the detent increasing an amount of force required to rotate the lid assembly with respect to the base assembly to an amount of force greater than a friction of the hinge mechanism when the spring-biased pawl is held in the depressed position;

wherein the recess in the rear wall receives a portion of the connector therein, and wherein the connector extends within the recess through a distance that is at least 60% of the width of the housing.

* * * * *